(12) United States Patent
Sakamoto et al.

(10) Patent No.: US 11,828,291 B2
(45) Date of Patent: Nov. 28, 2023

(54) MOTOR DEVICE, CONTROLLER, MOTOR SYSTEM, FAN UNIT, AND COMMUNICATION METHOD

(71) Applicant: Panasonic Intellectual Property Management Co., Ltd., Osaka (JP)

(72) Inventors: Mitsuhiro Sakamoto, Osaka (JP); Shinsuke Kimura, Kyoto (JP); Yasuyuki Yokouchi, Osaka (JP)

(73) Assignee: PANASONIC INTELLECTUAL PROPERTY MANAGEMENT CO., LTD., Kadoma (JP)

( * ) Notice: Subject to any disclaimer, the term of this patent is extended or adjusted under 35 U.S.C. 154(b) by 567 days.

(21) Appl. No.: 17/256,775

(22) PCT Filed: Jun. 24, 2019

(86) PCT No.: PCT/JP2019/024858
§ 371 (c)(1),
(2) Date: Dec. 29, 2020

(87) PCT Pub. No.: WO2020/008924
PCT Pub. Date: Sep. 1, 2020

(65) Prior Publication Data
US 2021/0140441 A1 May 13, 2021

(30) Foreign Application Priority Data
Jul. 6, 2018 (JP) .................... 2018-128880

(51) Int. Cl.
*F04D 25/06* (2006.01)
*F04D 27/00* (2006.01)

(52) U.S. Cl.
CPC ....... *F04D 25/0693* (2013.01); *F04D 27/001* (2013.01)

(58) Field of Classification Search
CPC .. F04D 25/0693; F04D 27/001; F04D 27/004; F05D 2270/335; F05D 2270/52;
(Continued)

(56) References Cited

U.S. PATENT DOCUMENTS

2013/0234630 A1 9/2013 Yang
2018/0043447 A1* 2/2018 Schwarzkopf .......... B60L 50/10
(Continued)

FOREIGN PATENT DOCUMENTS

JP 2014-123188 A 7/2014
JP 2014123188 A * 7/2014
JP 2018-70083 A 5/2018

OTHER PUBLICATIONS

JP-2014123188-A_translate (Year: 2014).*
(Continued)

*Primary Examiner* — Tulsidas C Patel
*Assistant Examiner* — Mohammed Ahmed Qureshi
(74) *Attorney, Agent, or Firm* — WHDA, LLP

(57) ABSTRACT

A motor device includes a motor, an input unit, a processing unit, and an electrical energy storage unit. The input unit accepts power supplied from a controller during a first period and receives at least a communication signal transmitted from the controller during a second period after the first period. The processing unit updates data for the motor in accordance with the communication signal received by the input unit. The electrical energy storage unit stores, based on the power supplied to the input unit, electrical energy for driving the processing unit.

16 Claims, 4 Drawing Sheets

(58) Field of Classification Search
CPC ......... Y02B 30/70; H02P 29/00; H02P 27/00;
H02P 27/04; H02P 27/06; H02P 21/00;
H02P 21/22; H02P 6/04; H02P 6/08;
H02P 6/28; H02P 6/12; H02P 29/024;
H02P 29/028
See application file for complete search history.

(56) References Cited

U.S. PATENT DOCUMENTS

2019/0256062 A1   8/2019  Masuda
2019/0257684 A1*  8/2019  Terada .................... G01F 23/32

OTHER PUBLICATIONS

International Search Report w/English translation and Written Opinion in Japanese dated Aug. 20, 2019, issued in counterpart International Application No. PCT/JP2019/024858 (7 pages).

* cited by examiner

MOTOR DEVICE, CONTROLLER, MOTOR SYSTEM, FAN UNIT, AND COMMUNICATION METHOD

This application is a National Stage Application filed under 35 U.S.C. § 371 of International Application No. PCT/JP2019/024858 filed on Jun. 24, 2019 which claims the benefit of priorities under 35 U.S.C. § 119(a) of Japanese Patent Application No. 2018-128880 filed in Japan on Jul. 6, 2018, the contents of which are incorporated herein by reference.

TECHNICAL FIELD

The present disclosure generally relates to a motor device, a controller, a motor system, a fan unit, and a communication method, and more particularly relates to a motor device with communication capability and a controller, a motor system, a fan unit, and a communication method.

BACKGROUND ART

Patent Literature 1 discloses a motor which is programmable about settings of rotational direction and velocity, for example, of the motor. The motor of Patent Literature 1 includes a sensor for sensing the frequency of an AC voltage applied by a controller. When the frequency of the AC voltage applied falls out of a normal frequency range of an AC voltage, the motor switches to a programming mode. Then, the motor detects a variation in the frequency of the AC voltage applied as programing data.

In the motor (motor device) of Patent Literature 1, unless sufficient power is supplied to operate a control processor (processing unit), the sensor may be unable to detect the frequency of the AC voltage applied by the controller, which is a problem with the motor (motor device). This prevents the motor device of Patent Literature 1 to switch to a programming mode and may fail to receive the programing data (communication signal), which is also a problem with the motor (motor device).

CITATION LIST

Patent Literature

Patent Literature 1: US 2013/0234630 A1

SUMMARY OF INVENTION

It is therefore an object of the present disclosure to provide a motor device, a controller, a motor system, a fan unit, and a communication method, all of which are configured or designed to facilitate reception of a communication signal transmitted from the controller.

A motor device according to an aspect of the present disclosure includes a motor, an input unit, a processing unit, and an electrical energy storage unit. The input unit accepts power supplied from a controller during a first period and receives at least a communication signal transmitted from the controller during a second period after the first period. The processing unit updates data for the motor in accordance with the communication signal received by the input unit. The electrical energy storage unit stores, based on the power supplied to the input unit, electrical energy for driving the processing unit.

A controller according to another aspect of the present disclosure is electrically connected to the motor device described above and supplies the power to, and transmits the communication signal to, the motor device.

A motor system according to still another aspect of the present disclosure includes the motor device described above and a controller. The controller is electrically connected to the motor device and supplies the power to, and transmits the communication signal to, the motor device.

A fan unit according to yet another aspect of the present disclosure includes a blade to be attached to the motor of the motor device and turns the blade on receiving force produced by the motor.

A communication method according to yet another aspect of the present disclosure is a method for establishing communication between a controller and a motor device including a motor. The communication method includes accepting power supplied from the controller during a first period and storing, based on the power accepted, electrical energy for driving a processing unit of the motor device in an electrical energy storage unit. The communication method further includes receiving at least a communication signal transmitted from the controller during a second period after the first period and updating the processing unit's data for the motor in accordance with the communication signal received.

DESCRIPTION OF EMBODIMENTS (1) Configuration

Figure 1:
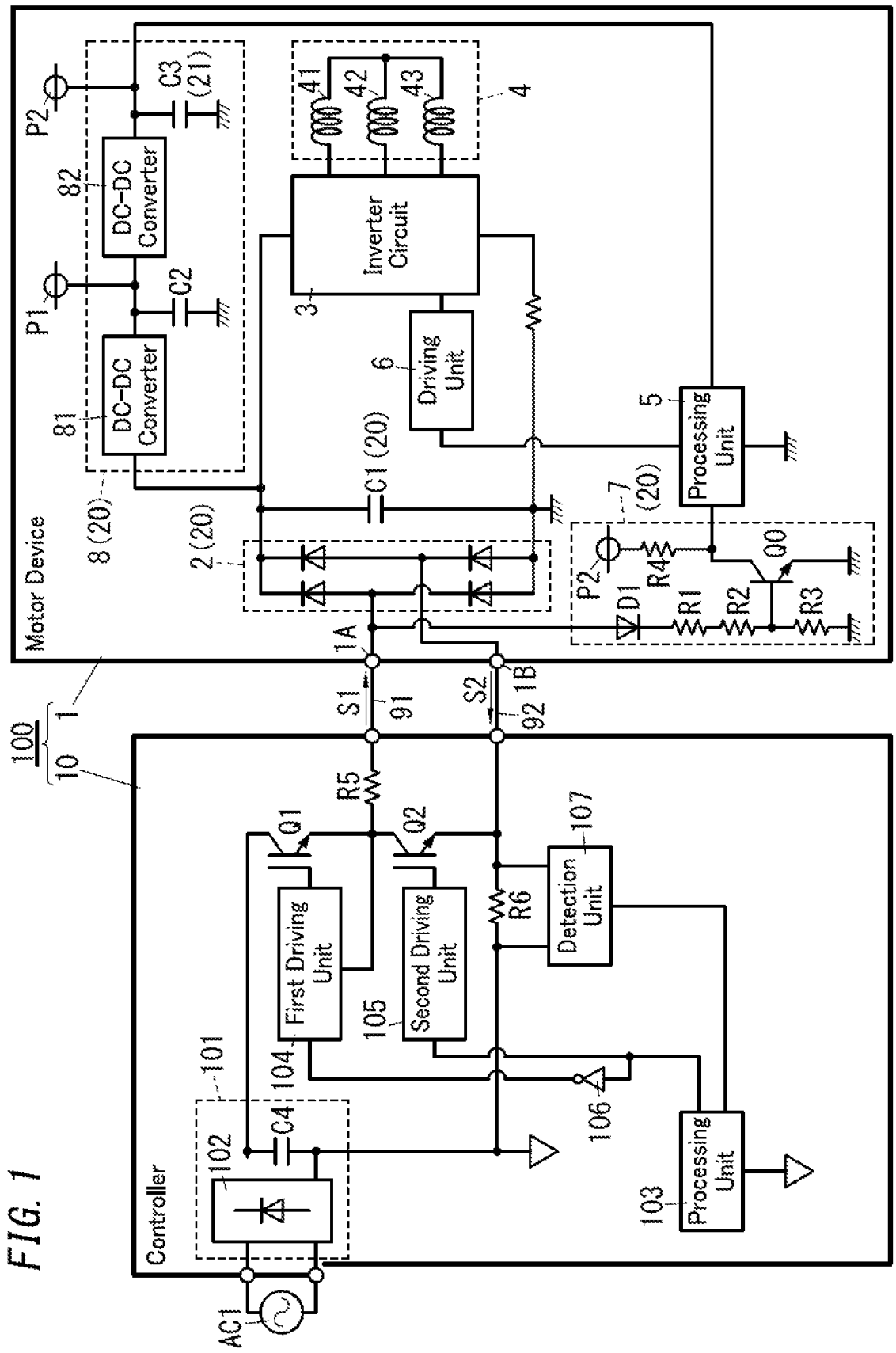
FIG. 1 is a circuit diagram schematically illustrating a motor system including a motor device and controller according to an exemplary embodiment of the present disclosure.

A motor device 1, controller 10, and motor system 100 according to an exemplary embodiment of the present disclosure will now be described. As shown in FIG. 1, the motor system 100 includes the motor device 1 and the controller 10. The motor device 1 includes a motor 4 and a circuit for driving the motor 4. The controller 10 is configured to be electrically connectible to the motor device 1 and supplies power to, and transmits a communication signal S1 to, to the motor device 1. The communication signal S1 may include data or a command for changing, for example, the settings of the motor device 1 (in other words, data for the motor 4).

According to this embodiment, there may arise two situations, namely, a situation where a power supply AC1 (see FIG. 2) is connected to the motor device 1 and a situation where the controller 10 is connected to the motor device 1. The motor system 100 is formed when the controller 10 is connected to the motor device 1. The power supply AC1 is an AC power supply, which may be a commercial power supply, for example.

Figure 2:
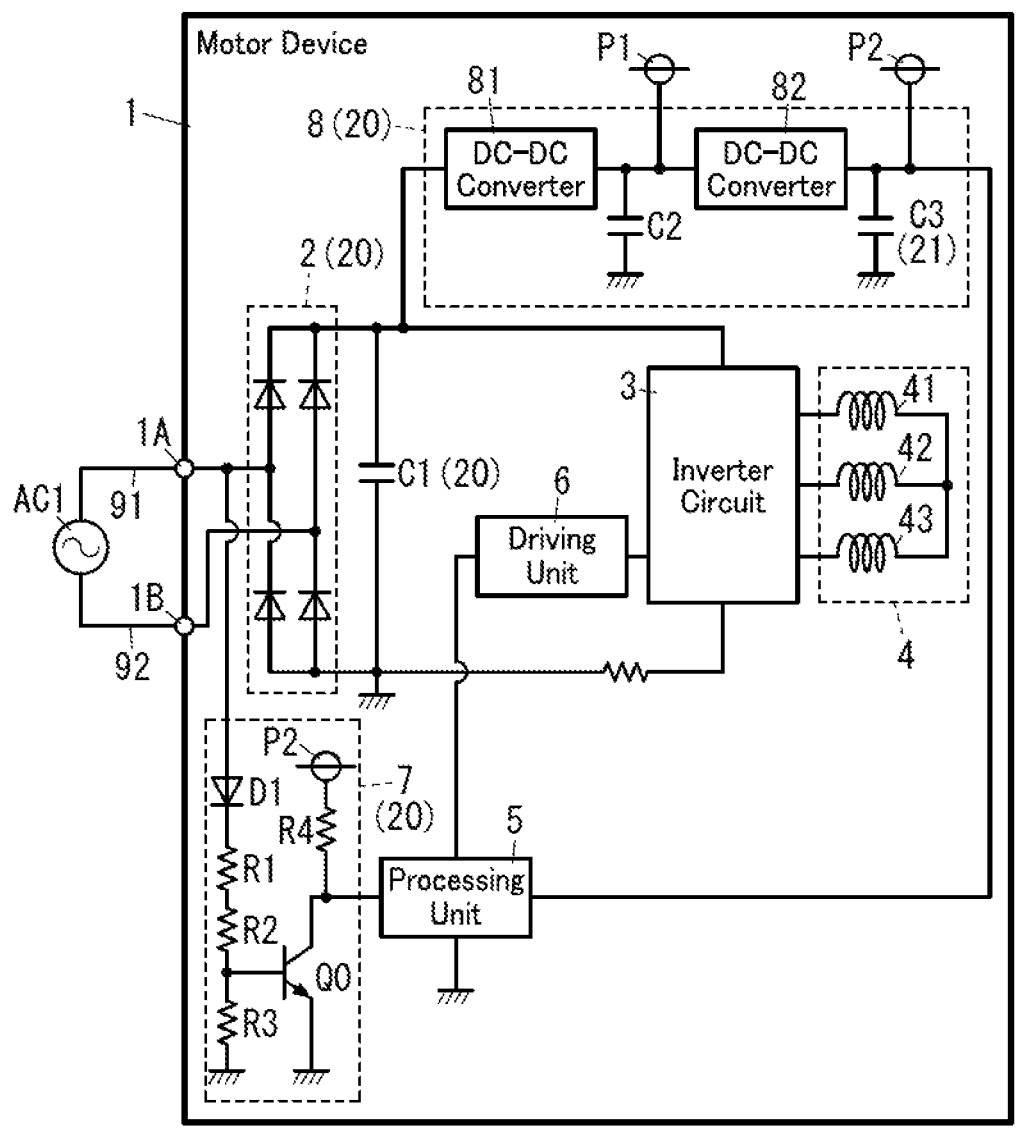
FIG. 2 is a circuit diagram schematically illustrating the motor device to which a power supply is connected.

As shown in FIGS. 1 and 2, the motor device 1 includes a pair of input terminals 1A, 1B, a rectifier circuit 2, an inverter circuit 3, the motor 4, a processing unit 5, a driving unit 6, a receiver circuit 7, a power supply circuit 8 and a capacitor C1. Either the controller 10 or the power supply AC1 is electrically connected to the pair of input terminals 1A, 1B via a pair of electric cables 91, 92. Note that the pair of input terminals 1A, 1B does not have to be terminals as parts to which the electric cables are connected, but may also be leads of an electronic part or parts of a conductor included in a circuit board, for example.

In this embodiment, the rectifier circuit 2, the receiver circuit 7, the power supply circuit 8, and the capacitor C1 all form parts of the input unit 20. If the controller 10 is connected to the motor device 1, the input unit 20 accepts power supplied from the controller 10 during a first period T1 (to be described later). The input unit 20 receives a communication signal S1 transmitted from the controller 10 during a second period T2 (to be described later) after the first period T1.

In this embodiment, the motor device 1 is electrically connected to the controller 10 via the pair of electric cables 91, 92. Thus, the input unit 20 accepts the power via the pair of electric cables 91, 92 electrically connected to the controller 10. In addition, the input unit 20 also receives the communication signal S1 via the pair of electric cables 91, 92. That is to say, the path along which power is supplied from the controller 10 to the motor device 1 is the same as the communication path between the controller 10 and the motor device 1.

The rectifier circuit 2 is a circuit for rectifying the voltage applied to the pair of input terminals 1A, 1B (hereinafter referred to as an "input voltage"). In this embodiment, the rectifier circuit 2 is implemented as a diode bridge. Therefore, in this embodiment, the rectifier circuit 2 full-wave rectifies the input voltage. Thus, if the input voltage is AC voltage, the rectifier circuit 2 outputs a pulsating voltage by full-wave rectifying the AC voltage. On the other hand, if the input voltage is DC voltage, then the rectifier circuit 2 outputs the input voltage without full-wave rectifying the input voltage (i.e., outputs the DC voltage as it is).

The capacitor C1 is electrically connected to a pair of output terminals of the rectifier circuit 2 and a pair of input terminals of the inverter circuit 3. The capacitor C1 is implemented as a smoothing capacitor, which smooths out the output voltage (pulsating voltage) of the rectifier circuit 2. Thus, the voltage across the capacitor C1 (DC voltage) is applied to the pair of input terminals of the inverter circuit 3.

The inverter circuit 3 is a so-called "three-phase inverter" and includes six switching elements. In this embodiment, each of the switching elements is implemented as an insulated gate bipolar transistor (IGBT). Between the collector and emitter of these switching elements, six commutation diodes are electrically connected, respectively. The six switching elements are driven by the driving unit 6. The driving unit 6 is controlled by the processing unit 5, thereby outputting a drive signal to the respective gates of the six switching elements. The six switching elements switch their ON/OFF states in accordance with the drive signal provided by the driving unit 6.

The inverter circuit 3 is controlled by the processing unit 5 via the driving unit 6. In this embodiment, when the processing unit 5 operates in a normal mode (to be described later), the inverter circuit 3 converts the input DC voltage into AC voltage and applies the AC voltage thus converted to the windings 41, 42, 43 of the motor 4, thereby supplying an alternating current to the windings 41, 42, 43.

The motor 4 is a synchronous motor and may be implemented as a so-called "brushless direct current (DC) motor."

The motor 4 includes three windings 41, 42, 43 which are connected together in a Y connection (star connection) pattern and which will be hereinafter referred to as a "first winding 41," a "second winding 42," and a "third winding 43," respectively. The motor 4 is configured to be driven by having a current (phase current) supplied to each of multiple different phases (namely, U, V, and W phases). In this embodiment, a U-phase current flows through the first winding 41, a V-phase current flows through the second winding 42, and a W-phase current flows through the third winding 43.

The processing unit 5 may be implemented as, for example, a computer (including a microcomputer) including, as major constituent elements, a processor and a memory. That is to say, the processing unit 5 is implemented as a computer system including a processor and a memory. The computer system performs the function of the processing unit 5 by making the processor execute an appropriate program. The program may be stored in advance in the memory. Alternatively, the program may also be downloaded via a telecommunications line such as the Internet or distributed after having been stored in a non-transitory storage medium such as a memory card. Operating power for the processing unit 5 may be generated by making the power supply circuit 8 convert the power supplied from either the power supply AC1 or the controller 10 into predetermined power.

The operation modes of the processing unit 5 include a normal mode in which the processing unit 5 drives the motor 4 and a communication mode in which the processing unit 5 communicates with the controller 10. The normal mode is an operation mode when the power supply AC1 is connected to the motor device 1. The communication mode is an operation mode when the controller 10 is connected to the motor device 1.

When the operation mode is the normal mode, the processing unit 5 reads out operation data stored in the memory and controls the driving unit 6 based on the operation data that has been read out, thereby controlling the six switching elements of the inverter circuit 3. In this manner, the processing unit 5 controls the motor 4 in accordance with the operation data. The operation data may include various parameters about the operation of the motor 4 such as the rotational direction and velocity of the motor 4 and acceleration thereof.

When the operation mode is the communication mode, the processing unit 5 receives the communication signal S1 transmitted from the controller 10 and updates the operation data stored in the memory in accordance with the data or command included in the communication signal S1 received. In other words, the processing unit 5 updates the operation data for the motor 4 in accordance with the communication signal S1 received by the input unit 20. That is to say, according to this embodiment, the motor device 1 is able to rewrite the operation data for the motor 4 by using the controller 10. It will be described in detail later in the "(2) Operation" section exactly how the motor device 1 receives the communication signal S1.

In addition, in the communication mode, the processing unit 5 may transmit a current signal S2 to the controller 10 that is electrically connected to the motor 4 by controlling the inverter circuit 3 to cause a current to flow through the windings 41, 42, 43 of the motor 4. In this embodiment, the processing unit 5 transmits the current signal S2 in response to the communication signal S1 transmitted from the controller 10. That is to say, in this embodiment, it is not until the controller 10 transmits the communication signal S1 that the processing unit 5 transmits the current signal S2.

The receiver circuit 7 is a voltage step-down circuit, which receives the communication signal S1 applied to the pair of input terminals 1A, 1B and passes the communication signal S1 to the processing unit 5. In this embodiment, the communication signal S1 is a voltage signal as will be described later. Thus, the receiver circuit 7 receives a voltage signal as the communication signal S1 to be passed to the input unit 20 and outputs the voltage signal to the processing unit 5. The receiver circuit 7 includes a diode D1, four resistors R1-R4, and a switching element Q0. The anode of the diode D1 is electrically connected to the high-potential input terminal 1A, out of the pair of input terminals 1A, 1B. Between the cathode of the diode D1 and a reference potential (e.g., ground in this example), three resistors R1-R3 are electrically connected together in series. The three resistors R1-R3 together form a voltage divider circuit for dividing the voltage applied between the pair of input terminals 1A, 1B. The switching element Q0 may be implemented as, for example, an NPN bipolar transistor. The emitter of the switching element Q0 is electrically connected to the reference potential. The base of the switching element Q0 is electrically connected to a connection point of the resistors R2, R3. The collector of the switching element Q0 is electrically connected to a second power supply terminal P2 (to be described later) via a resistor R4, which is a pull-up resistor. The collector of the switching element Q0 is also electrically connected to a signal input terminal of the processing unit 5.

The switching element Q0 turns ON when the magnitude of the voltage applied between the pair of input terminals 1A, 1B exceeds a predetermined value and turns OFF when the magnitude of the voltage applied between the pair of input terminals 1A, 1B becomes equal to or less than the predetermined value. That is to say, the switching element Q0 switches its ON/OFF states in accordance with a voltage signal (i.e., the communication signal S1). If the switching element Q0 is ON, a voltage corresponding to the reference potential is delivered to the processing unit 5. On the other hand, if the switching element Q0 is OFF, then a voltage corresponding to a terminal voltage of the second power supply terminal P2 is delivered to the processing unit 5.

That is to say, while a DC voltage is being applied between the pair of input terminals 1A, 1B, a zero voltage (reference voltage) is applied continuously to the processing unit 5. Also, if the voltage signal (communication signal S1) is applied between the pair of input terminals 1A, 1B, the communication signal S1 is passed to the processing unit 5. That is to say, in that case, a binary signal (digital signal) that may have one of two values, namely, a high level (i.e., a terminal voltage at the power supply terminal P2) and a low level (i.e., the reference potential), is input as the communication signal S1 to the processing unit 5 according to the ON/OFF state of the switching element Q0.

The power supply circuit 8 converts the voltage across the capacitor C1 into predetermined voltage and delivers the predetermined voltage to a first power supply terminal P1 and the second power supply terminal P2. The first power supply terminal P1 is a terminal which is electrically connected to the driving unit 6 to provide electrical energy for driving to the driving unit 6. The second power supply terminal P2 is a terminal electrically connected to the processing unit 5 to provide electrical energy for driving to the processing unit 5. The power supply circuit 8 includes two DC/DC converters 81, 82 and two capacitors C2, C3.

The DC/DC converter 81 steps down the voltage across the capacitor C1 to a first DC voltage and outputs the first DC voltage. The first DC voltage may be ten-odd V, for example. The capacitor C2 is electrically connected to an output terminal of the DC/DC converter 81 and also electrically connected between the first power supply terminal P1 and a reference potential. The capacitor C2 stores electrical energy upon the application of the first DC voltage thereto and provides the electrical energy stored for the first power supply terminal P1. That is to say, the capacitor C2 stores electrical energy for driving the driving unit 6.

The DC/DC converter 82 steps down the first DC voltage to a second DC voltage and outputs the second DC voltage. The second DC voltage may be a few V, for example. The capacitor C3 is electrically connected to an output terminal of the DC/DC converter 82 and also electrically connected between the second power supply terminal P2 and the reference potential. The capacitor C3 stores electrical energy upon the application of the second DC voltage thereto and provides the electrical energy stored for the second power supply terminal P2. That is to say, the capacitor C3 stores electrical energy for driving the processing unit 5. In other words, the capacitor C3 corresponds to an electrical energy storage unit 21 for storing, based on the power supplied to the input unit 20, electrical energy for driving the processing unit 5 Thus, the power supply circuit 8 converts the voltage applied to the input unit 20 into predetermined voltage and delivers the predetermined voltage to the electrical energy storage unit 21.

As shown in FIG. 1, the controller 10 includes a DC power supply 101, a processing unit 103, a first driving unit 104, a second driving unit 105, an inverter element 106, a detection unit 107, a current-limiting resistor R5, a detection resistor R6, and two switching elements Q1, Q2. Both of the two switching elements Q1, Q2 are insulated gate bipolar transistors (IGBTs).

The first driving unit 104 and the second driving unit 105 are drivers for driving the switching elements Q1, Q2, respectively, and may be implemented as high voltage ICs (HVICs). The inverter element 106 inverts a second drive signal to be passed from the processing unit 103 to the second driving unit 105 and outputs the inverted second drive signal as a first drive signal to the first driving unit 104. That is to say, if the switching element Q1 is ON, then the switching element Q2 turns OFF. If the switching element Q1 is OFF, then the switching element Q2 turns ON. The current-limiting resistor R5 reduces an inrush current that may be generated when the controller 10 is started.

The controller 10 is a portable terminal that the user may carry with him or her, for example. As used herein, the user refers to a person who uses the controller 10. Examples of the users include a person who purchases the motor device 1 and a person who provides the motor device 1 for business use.

The DC power supply 101 converts an AC voltage output from an AC power supply (i.e., the power supply AC1 in this example) connected to the controller 10 into a DC voltage and outputs the DC voltage thus converted. The DC power supply 101 includes a rectifier circuit 102 and a capacitor C4. The rectifier circuit 102 is a circuit for rectifying the AC voltage fed from the AC power supply (i.e., the power supply AC1 in this example) and implemented as a diode bridge. Therefore, in this embodiment, the rectifier circuit 102 full-wave rectifies the input AC voltage. The capacitor C4 is electrically connected to a pair of output terminals of the rectifier circuit 102. The capacitor C4 is implemented as a smoothing capacitor, which smooths out the output voltage (pulsating voltage) of the rectifier circuit 102. Thus, the DC power supply 101 outputs the voltage across the capacitor C4 (i.e., a DC voltage).

The processing unit 103 may be implemented as, for example, a computer (including a microcomputer) including, as major constituent elements, a processor and a memory. That is to say, the processing unit 103 is implemented as a computer system including a processor and a memory. The computer system performs the function of the processing unit 103 by making the processor execute an appropriate program. The program may be stored in advance in the memory. Alternatively, the program may also be downloaded via a telecommunications line such as the Internet or distributed after having been stored in a non-transitory storage medium such as a memory card. Operating power for the processing unit 103 may be generated by making a power supply circuit that the controller 10 includes convert the power supplied from the power supply AC1 to predetermined power.

The processing unit 103 has the capability of generating a voltage signal by changing, in a predetermined pattern, the magnitude of voltage to be output from the controller 10 to the motor device 1 and transmitting, as the communication signal S1, the voltage signal thus generated to the motor device 1. In this embodiment, the processing unit 103 changes the magnitude of the output voltage of the controller 10 by controlling the first driving unit 104 and the second driving unit 105 to switch the ON/OFF states of the two switching elements Q1, Q2. Specifically, the processing unit 103 makes the controller 10 deliver the output voltage of the DC power supply 101 by turning the switching elements Q1, Q2 ON and OFF, respectively. In addition, the processing unit 103 also makes the pair of electric cables 91, 92 short-circuited with each other and sets the output voltage of the controller 10 at zero by turning the switching elements Q1, Q2 OFF and ON, respectively.

That is to say, according to this embodiment, the communication signal S1 generated by the controller 10 is a voltage signal that may have one of the two values of high and low levels. As used herein, the "high level" corresponds to the magnitude of the output voltage of the DC power supply 101 and the "low level" corresponds to zero.

In this embodiment, the processing unit 103 transmits the communication signal S1, including data of multiple bits, to the motor device 1 on a bit-by-bit basis by changing the output voltage of the controller 10 in accordance with the data and command to transmit. That is to say, according to this embodiment, the type of communication between the processing unit 5 and the controller 10 is asynchronous serial communication.

The detection unit 107 detects a current flowing through the detection resistor R6 by detecting the voltage across the detection resistor R6. In this embodiment, when the controller 10 is connected to the motor device 1, the detection resistor R6 is electrically connected between a low-potential terminal of the DC power supply 101 and the low-potential input terminal 1B of the motor device 1. Also, if the motor device 1 generates the current signal S2 in the communication mode, the current flowing from the motor device 1 to the controller 10 flows through the detection resistor R6. That is to say, the detection unit 107 detects the current flowing from the motor device 1 to the controller 10 by the generation of the current signal S2. The detection unit 107 outputs the result of detection to the processing unit 103. Thus, the processing unit 103 receives the current signal S2 from the motor device 1 no sooner than has the detection unit 107 detected a current flowing from the motor device 1 to the controller 10 in the communication mode.

Figure 3:
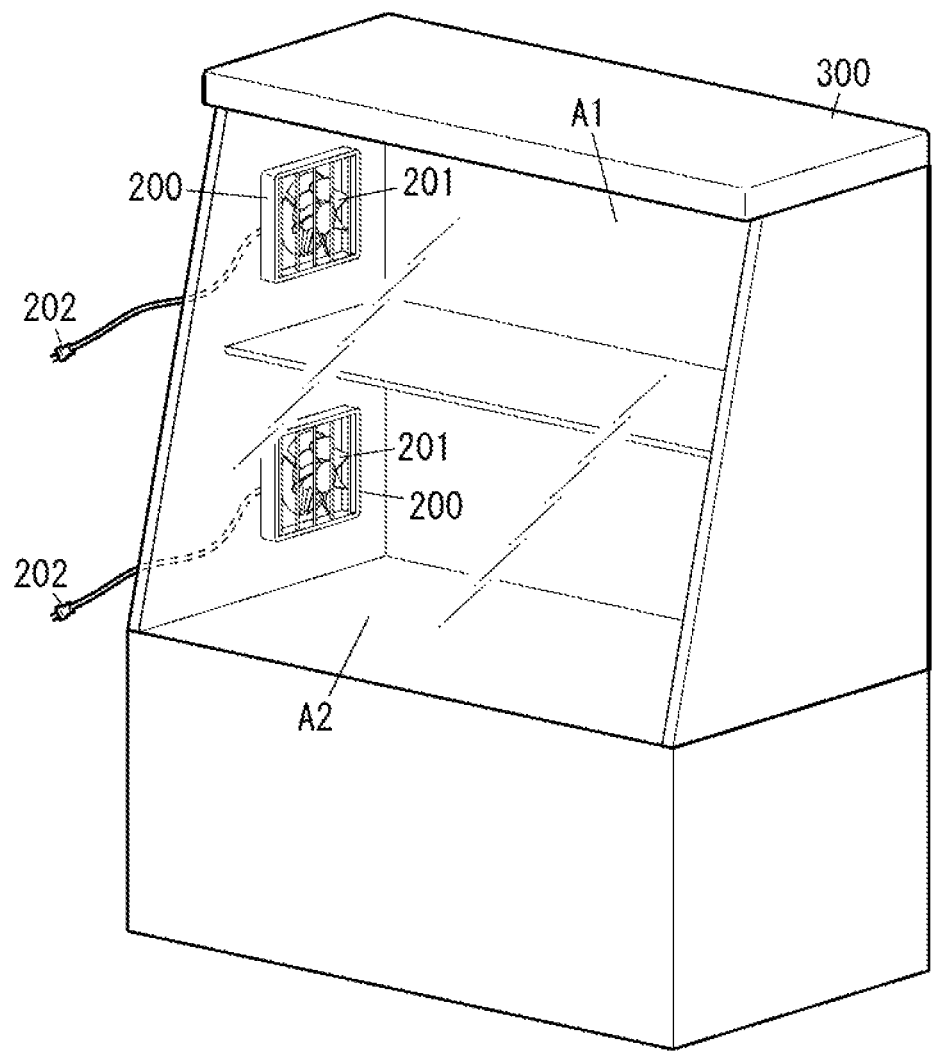
FIG. 3 schematically illustrates an exemplary use of a fan unit including the motor device.

The motor device 1 according to this embodiment may be built in a fan unit 200 such as the ones shown in FIG. 3, for example. In FIG. 3, illustration of the motor device 1 is omitted. Each fan unit 200 includes the motor device 1, blades 201, and a power cable 202. The blades 201 are mounted on the rotational shaft of the motor 4 of the motor device 1 and turn as the motor 4 is driven. In other words, the fan unit 200 turns the blades 201 on receiving the force produced by the motor device 1. That is to say, when the motor device 1 is used in the fan unit 200, the load for the motor device 1 is the blades 201.

The fan unit 200 may be used as, for example, a cooling fan for business use, for example. In the example illustrated in FIG. 3, the fan units 200 are provided for a refrigerator showcase 300 with two (upper and lower) display spaces A1, A2. Specifically, two fan units 200 are respectively attached to a sidewall of the upper display space A1 and a sidewall of the lower display space A2.

Each fan unit 200 is electrically connected to the power supply AC1 by connecting the power cable 202 to an AC outlet. When connected to the power supply AC1, the motor device 1 of each fan unit 200 operates in the normal mode. That is to say, when connected to the power supply AC1, each fan unit 200 turns the blades 201 in accordance with the operation data that the processing unit 5 of the motor device 1 has. This allows the two fan units 200 to cool the display spaces A1, A2, respectively.

In addition, each fan unit 200 is also electrically connected to the controller 10 by connecting the power cable 202 to the controller 10. While connected to the controller 10, the motor device 1 of each fan unit 200 operates in the communication mode. That is to say, while connected to the controller 10, each fan unit 200 updates the operation data that the processing unit 5 of the motor device 1 has in accordance with the data or commands included in the communication signal S1 transmitted from the controller 10.

In this case, the two fan units 200 may update the operation data into two different sets by using the controller 10. For example, the operation data of the respective fan units 200 may be updated by the controller 10 to cool the upper display space A1 to 5° C. and cool the lower display space A2 to 0° C. That is to say, when a plurality of fan units 200 are provided, the operation data may be updated on an individual basis by using the controller 10. Alternatively, the operation data of all fan units 200 may naturally be updated into a single set of operation data by using the controller 10.

(2) Operation

Figure 4A:
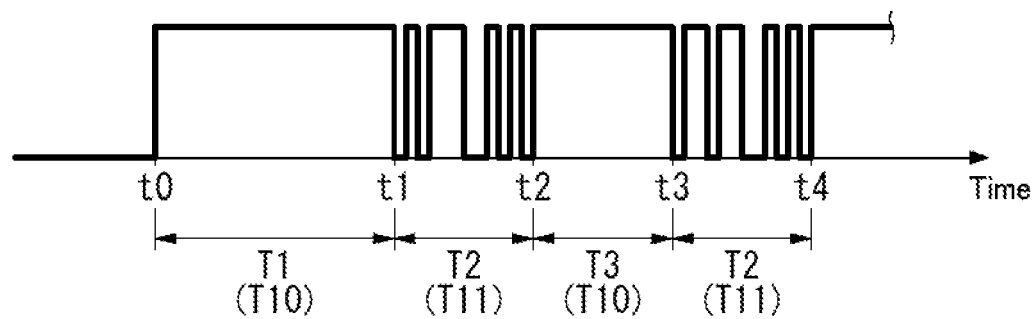
FIG. 4A is a waveform chart of output voltage of the controller.
Figure 4B:
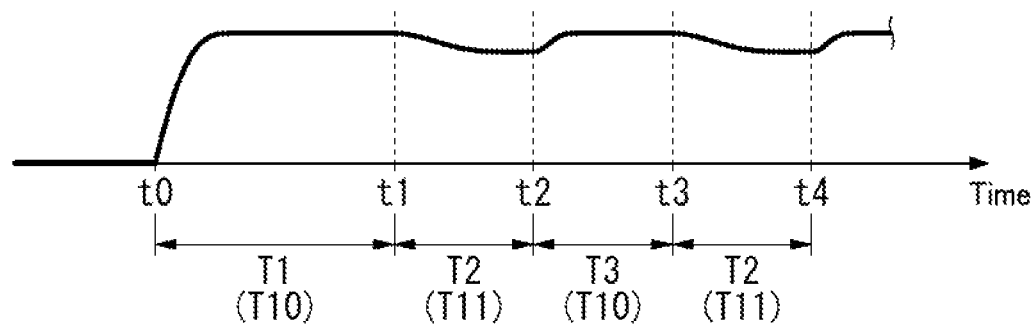
FIG. 4B is a waveform chart of voltage applied to an electrical energy storage unit of the motor device.
Figure 4C:
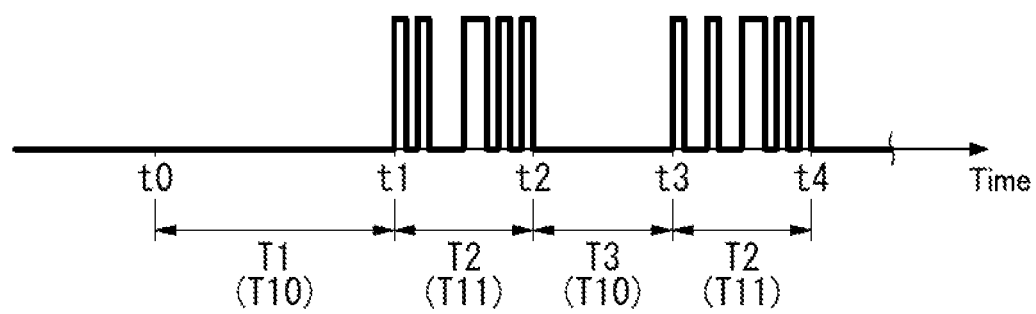
FIG. 4C is a waveform chart of voltage applied to a processing unit of the motor device.

Next, it will be described with reference to FIGS. 4A-4C how the controller 10 transmits the communication signal S1 and how the motor device 1 receives the communication signal S1. FIG. 4A illustrates the waveform of the output voltage of the controller 10. FIG. 4B illustrates the waveform of the voltage across the electrical energy storage unit 21 (i.e., the capacitor C3 in this example). FIG. 4C illustrates the waveform of the communication signal S1 to be passed to the processing unit 5 of the motor device 1.

First of all, it will be described how the controller 10 transmits the communication signal S1. When connected to the motor device 1 while its power is ON, the controller 10 starts transmitting the communication signal S1 to the motor device 1. In this case, the transmission processing by the controller 10 may be triggered by accepting a predetermined operating command from the user. In the example illustrated in FIGS. 4A-4C, a point in time when the controller 10 starts the transmission processing is a time to.

In the transmission processing, the processing unit 103 of the controller 10 transfers the output voltage of the DC power supply 101 to the motor device 1 by turning the switching elements Q1, Q2 ON and OFF, respectively, for the first certain period (i.e., a period from the time t0 through a time t1). This certain period is a supply period T10 for supplying power to the input unit 20. Next, the processing unit 103 generates a voltage signal (i.e., the communication signal S1) by appropriately switching the ON/OFF states of the switching elements Q1, Q2 and thereby changing the magnitude of the output voltage of the controller 10 for a certain period (i.e., a period from the time t1 through a time t2). This certain period corresponds to a transmission period T11 for transmitting the communication signal S1 to the input unit 20.

In this embodiment, the controller 10 alternately goes through the supply period T10 and the transmission period T11 during the transmission processing. In the example illustrated in FIGS. 4A-4C, the period from the time to through the time t1 is the first cycle of the supply period T10, the period from the time t1 through the time t2 is the first cycle of the transmission period T11, the period from the time t2 through a time t3 is the second cycle of the supply period T10, and the period from the time t3 through a time t4 is the second cycle of the transmission period T11. In this embodiment, the supply period T10 has a constant duration (or time length) of a few hundred ms, for example. Also, in this embodiment, the transmission period T11 also has a constant duration of ten-odd ms, for example. That is to say, in this embodiment, each of the supply period T10 and the transmission period T11 has a fixed duration. Note that in this embodiment, the duration of the second and following cycles of the supply period T10 is shorter than that of the first cycle of the supply period T10. The transmission processing continues until the transmission of the communication signal S1 is completed.

Next, it will be described how the motor device 1 receives the communication signal S1. In the motor device 1, a DC voltage is applied between the pair of input terminals 1A, 1B for a period corresponding to the first cycle of the supply period T10. That is to say, the first period T1 in the motor device 1 corresponds to the first cycle of the supply period T10 in the controller 10. In addition, in the motor device 1, a DC voltage is applied between the pair of input terminals 1A, 1B for a period corresponding to any of the second and following cycles of the supply period T10. That is to say, the second and following cycles of the supply periods T10 correspond to the third period T3 in the motor device 1. The third period T3 may be a period in which the motor device 1 generates the current signal S2 in response to the communication signal S1 transmitted from the controller 10.

In the first period T1 and third period T3, the DC voltage is applied to the input unit 20, thus causing electrical energy to be stored in the capacitor C3 (electrical energy storage unit 21) of the power supply circuit 8. Thus, the voltage across the capacitor C3 continues to rise with the passage of time until the capacitor C3 is fully charged. That is to say, the motor device 1 is supplied with power from the controller 10 continuously since the controller 10 has started the transmission processing and until the first period T1 passes, thus causing electrical energy to be stored in the electrical energy storage unit 21. In addition, every time the transmission period T11 of the controller 10 passes, the motor device 1 is supplied with power from the controller 10, thus causing electrical energy to be stored in the electrical energy storage unit 21. Thus, the electrical energy storage unit 21 will maintain a state that the electrical energy for driving the processing unit 5 is sufficiently stored until the transmission processing of the controller 10 ends.

In this embodiment, the processing unit 5 of the motor device 1 switches the operation mode to either the normal mode or the communication mode by monitoring the output voltage of the receiver circuit 7. Specifically, if the power supply AC1 is connected to the motor device 1, an AC voltage with a frequency of 50 Hz or 60 Hz is applied between the pair of input terminals 1A, 1B. Thus, the output voltage of the receiver circuit 7 is a pulse voltage with a frequency of 50 Hz or 60 Hz. On the other hand, if the controller 10 is connected to the motor device 1, a DC voltage will be applied continuously between the pair of input terminals 1A, 1B for at least a certain period (i.e., the first period T1). Thus, the output voltage of the receiver circuit 7 will be the zero voltage.

Therefore, if the output voltage of the receiver circuit 7 is a pulse voltage, then the processing unit 5 switches the operation mode to the normal mode. On the other hand, if the output voltage of the receiver circuit 7 remains a zero voltage for a certain period (i.e., the first period T1), then the processing unit 5 switches the operation mode to the communication mode. As can be seen, according to this embodiment, the processing unit 5 determines, based on the waveform of the voltage applied to the input unit 20 (i.e., the output voltage of the receiver circuit 7 in this example), whether or not the controller 10 is connected. Note that to allow the processing unit 5 to accurately determine whether or not the controller 10 is connected, the duration of the first period T1 is suitably longer than one cycle time of the power supply AC1.

In this example, in the first period T1, a DC voltage is applied continuously between the pair of input terminals 1A, 1B, and therefore, the processing unit 5 switches the operation mode to the communication mode. After that, in the motor device 1, a voltage signal (communication signal S1) will be applied between the pair of input terminals 1A, 1B in each of the periods corresponding to the first cycle of the transmission period T11 and the period corresponding to the second cycle of the transmission period T11. That is to say, the second period T2 in the motor device 1 corresponds to the transmission period T11 in the controller 10.

In the second period T2, the voltage signal applied between the pair of input terminals 1A, 1B is converted by the receiver circuit 7 into a binary signal. Then, the processing unit 5 receives the communication signal S1 by receiving the binary signal from the receiver circuit 7. In the second period T2, as the processing unit 5 operates, the electrical energy stored in the electrical energy storage unit 21 may be consumed. However, since electrical energy will be stored in the electrical energy storage unit 21 in a third period T3 after the second period T2 as described above, the electrical energy storage unit 21 maintains a state that electrical energy for driving the processing unit 5 is sufficiently stored.

In addition, in the third period T3 after the second period T2, the processing unit 5 generates a current signal S2 by controlling the driving unit 6 to cause a current to flow through the windings 41, 42, 43 of the motor 4. Thus, in the third period T3, the processing unit 5 transmits the current signal S2 to the controller 10 in response to the communication signal S1. The processing unit 103 of the controller 10 makes the detection resistor R6 and the detection unit 107 receive the current signal S2.

As described above, before the controller 10 transmits the communication signal S1, the motor device 1 according to this embodiment receives the power supplied from the controller 10, thus allowing electrical energy for driving the processing unit 5 to be stored in the electrical energy storage unit 21. This increases, when the controller 10 transmits the communication signal S1, the chances of the processing unit 5 operating normally according to this embodiment with the electrical energy stored in the electrical energy storage unit 21, thus achieving the advantage of facilitating reception of the communication signal S1 transmitted from the controller 10.

Besides, this embodiment also allows the operation data for the motor device 1 (stated otherwise, data for the motor 4) to be changed as needed by using the controller 10, thus achieving the advantage of making a single type of motor device 1 compatible with various specifications.

(3) Variations

Note that the embodiment described above is only one of various embodiments of the present disclosure and should not be construed as limiting. Rather, the embodiment described above may be readily modified in various manners depending on a design choice or any other factor without departing from the scope of the present disclosure. Optionally, the same functions as those of the motor device 1 may also be implemented as a communication method, a computer program, or a non-transitory storage medium on which the program is stored, for example.

A communication method according to an aspect is a method for establishing communication between the controller 10 and the motor device 1 including the motor 4. The communication method includes accepting power supplied from the controller 10 during a first period T1 and storing, based on the power accepted, electrical energy for driving the processing unit 5 of the motor device 1 in the electrical energy storage unit 21. The communication method further includes receiving at least the communication signal S1 transmitted from the controller 10 during a second period T2 after the first period T1 and updating the processing unit's 5 data for the motor 4 in accordance with the communication signal S1 received.

Next, variations of the embodiment described above will be enumerated one after another. Note that the variations to be described below may be adopted in combination as appropriate.

The motor device 1 according to the present disclosure may include a computer system in the processing unit 5, for example. In that case, the computer system may include, as principal hardware components, a processor and a memory. The functions of the motor device 1 according to the present disclosure may be performed by making the processor execute a program stored in the memory of the computer system. The program may be stored in advance in the memory of the computer system. Alternatively, the program may also be downloaded through a telecommunications line or be distributed after having been recorded in some storage medium such as a memory card, an optical disc, or a hard disk drive, any of which is readable for the computer system. The processor of the computer system may be made up of a single or a plurality of electronic circuits including a semiconductor integrated circuit (IC) or a largescale integrated circuit (LSI). Those electronic circuits may be either integrated together on a single chip or distributed on multiple chips, whichever is appropriate. Those multiple chips may be integrated together in a single device or distributed in multiple devices without limitation.

In the embodiment described above, the electrical energy storage unit 21 is implemented as the capacitor C3 of the power supply circuit 8. However, this is only an example of the present disclosure and should not be construed as limiting. That is to say, the electrical energy storage unit 21 only needs to be a capacitor on a path for providing electrical energy for operating the processing unit 5. Therefore, the capacitor C1, C2, for example, may also be regarded as the electrical energy storage unit 21. Still alternatively, the electrical energy storage unit 21 does not have to be a capacitor but may also be a secondary battery.

Also, in the embodiment described above, the communication signal S1 to be given to the processing unit 5 is a binary signal (digital signal) that may have one of two values, namely, high level and low level, depending on the ON/OFF states of the switching element Q0 in the receiver circuit 7. However, this is only an example of the present disclosure and should not be construed as limiting. Alternatively, the communication signal S1 given to the processing unit 5 may also be an analog signal, for example. In that case, the processing unit 5 may have an input analog voltage converted into a digital value by, for example, an A/D converter provided in the processing unit 5 and may analyze the value thus converted to obtain data.

Furthermore, in the embodiment described above, the communication signal S1 may include data or a command for changing the settings of the motor device 1, for example. However, this is only an example of the present disclosure and should not be construed as limiting. Optionally, the communication signal S1 may include, for example, data for upgrading a version of a program to be executed by the processing unit 5. That is to say, the data for the motor 4 includes at least one of the operation data for the motor 4 and the data for upgrading the version of the program for use to control the motor 4.

Furthermore, in the embodiment described above, if a plurality of motor devices 1 are connected to a single controller 10 to transmit the communication signal S1 to the plurality of motor devices 1, then the communication signal S1 suitably includes addresses to identify the respective motor devices 1. As the address, a serial number (product serial number) unique to each motor device 1 may be used, for example. According to such an implementation, each motor device 1 determines whether or not an address included in the communication signal S1 matches its own address and receives the communication signal S1 when the two addresses match each other.

Furthermore, in the embodiment described above, the motor device 1 and the controller 10 are connected together via the pair of electric cables 91, 92, i.e., via two wires. However, this is only an example of the present disclosure and should not be construed as limiting. Alternatively, the motor device 1 and the controller 10 may also be connected together via three wires including a ground wire. Still alternatively, the motor device 1 and the controller 10 may also be connected together via three or more electric cables including one or more signal lines.

Furthermore, in the embodiment described above, each of the supply period T10 and the transmission period T11 has a fixed duration (time length). However, this is only an example of the present disclosure and should not be construed as limiting. Alternatively, at least one of the supply period T10 or the transmission period T11 may have a variable time length. For example, the processing unit 5 may monitor the voltage across the capacitor C3. When finding the voltage across the capacitor C3 greater than a predetermined voltage, the processing unit 5 transmits a current signal S2 indicating that as an interrupt signal to the controller 10. On receiving the interrupt signal, the controller 10 starts transmitting the communication signal S1 even in the middle of the supply period T10, i.e., switches to the transmission period T11. According to this implementation, the supply period T10 comes to have a time length that varies according to the voltage across the capacitor C3.

Optionally, the controller 10 may extend the transmission period T11 if the data size of the communication signal S1 is large and may shorten the transmission period T11 if the data size of the communication signal S1 is small, for example. In that case, the transmission period T11 is set such that the electrical energy stored in the electrical energy storage unit 21 does not decrease by discharging to less than the electrical energy required to drive the processing unit 5. In other words, the transmission period T11 is a period in which the output voltage of the electrical energy storage unit 21 does not decrease to less than the voltage required to drive the processing unit 5.

Furthermore, in the embodiment described above, if the communication signal S1 has too large a data size to transmit within a single transmission period T11, for example, then the controller 10 may divide the communication signal S1 into multiple segments and transmit the multiple segments separately over a plurality of transmission periods T11.

Furthermore, in the embodiment described above, the processing unit 5 transmits the current signal S2 to the controller 10 in the third period T3 in response to the communication signal S1. However, it is optional for the processing unit 5 whether or not to transmit the current signal S2.

Furthermore, in the embodiment described above, the motor device 1 is used to turn the blades 201 of the fan unit 200. However, this is only an example of the present disclosure and should not be construed as limiting the use of the motor device 1. That is to say, the motor device 1 just needs to be configured to drive a load attached to the motor 4 by driving the motor 4 in accordance with the operation data that the processing unit 5 has. Thus, the use of the motor device 1 is not limited to any particular type of load.

Furthermore, in the embodiment described above, the controller 10 transmits the communication signal S1 to the motor device 1 by asynchronous serial communication through the pair of electric cables 91, 92 connected between the controller 10 and the motor device 1. However, this is only an example of the present disclosure and should not be construed as limiting. Alternatively, the controller 10 may also be configured to transmit the communication signal S1 to the motor device 1 through a different communications path (no matter whether the path is wired or wireless) without using the pair of electric cables 91, 92, for example.

Furthermore, in the embodiment described above, frequency modulation may be adopted as a method of communication between the controller 10 and the motor device 1 as in the motor device 1 of Patent Literature 1. Nevertheless, according to the implementation, it takes some time for the processing unit 5 of the motor device 1 to measure the frequency of the communication signal S1, thus possibly making it difficult to increase the communication rate. In addition, according to this implementation, the frequency measured by the processing unit 5 of the motor device 1 needs to be converted into binary reception data of zero or one, which makes the reception processing complicated and troublesome. Furthermore, this implementation requires a configuration that allows the controller 10 to vary the frequency of the output voltage, thus often making the design too complicated.

Furthermore, in the embodiment described above, the motor 4 that the motor device 1 includes is a brushless DC motor. However, this is only an example of the present disclosure and should not be construed as limiting. Alternatively, the motor 4 may also be, for example, a three-phase induction motor, a single-phase induction motor, or any other type of motor. Also, the inverter circuit 3 and the driving unit 6 may also be replaced with different driver circuits as appropriate according to the type of the motor 4. Even so, the processing unit 5 may also generate the current signal S2 by controlling the driver circuits and causing a current to flow through the windings that the motor 4 has.

(Resume)

As can be seen from the foregoing description, a motor device (1) according to a first aspect includes a motor (4), an input unit (20), a processing unit (5), and an electrical energy storage unit (21). The input unit (20) accepts power supplied from a controller (10) during a first period (T1) and receives at least a communication signal (S1) transmitted from the controller (10) during a second period (T2) after the first period (T1). The processing unit (5) updates data for the motor (4) in accordance with the communication signal (S1) received by the input unit (20). The electrical energy storage unit (21) stores, based on the power supplied to the input unit (20), electrical energy for driving the processing unit (5).

This aspect achieves the advantage of facilitating reception of the communication signal (S1) transmitted from the controller (10).

In a motor device (1) according to a second aspect, which may be implemented in conjunction with the first aspect, the input unit (20) accepts the power via a pair of electric cables (91, 92) to be electrically connected to the controller (10). The input unit (20) receives the communication signal (S1) via the pair of electric cables (91, 92).

This aspect achieves the advantage of eliminating the need to separately provide a communication path from the controller (10) to the motor device (1).

In a motor device (1) according to a third aspect, which may be implemented in conjunction with the first or second aspect, the processing unit (5) determines, based on a waveform of voltage applied to the input unit (20), whether or not the controller (10) is connected to the motor device (1).

This aspect achieves the advantage of reducing, when a power supply (AC1) is connected to the motor device (1), the chances of taking the power received from the power supply (AC1) for a communication signal (S1).

In a motor device (1) according to a fourth aspect, which may be implemented in conjunction with any one of the first to third aspects, the controller (10) alternately goes through a supply period (T10) in which the controller (10) supplies the power to the input unit (20) and a transmission period (T11) in which the controller (10) transmits the communication signal (S1) to the input unit (20).

This aspect achieves the advantage of allowing even a communication signal (S1), which has too large a data size to transmit within a single transmission period (T11), to be received by the motor device (1) discretely by dividing the communication signal (S1) into multiple segments.

In a motor device (1) according to a fifth aspect, which may be implemented in conjunction with the fourth aspect, the transmission period (T11) is a period in which output voltage of the electrical energy storage unit (21) does not decrease to less than voltage required to drive the processing unit (5).

This aspect achieves the advantage of reducing the chances of making the communication between the motor device (1) and the controller (10) complicated by setting, according to the capacitance of a capacitor (C1), the durations of the supply period (T10) and the transmission period (T11) at fixed lengths.

In a motor device (1) according to a sixth aspect, which may be implemented in conjunction with any one of the first to fifth aspects, communication established between the processing unit (5) and the controller (10) is asynchronous serial communication.

This aspect achieves the advantage of establishing communication between the motor device (1) and the controller (10) using a simpler design than parallel communication.

In a motor device (1) according to a seventh aspect, which may be implemented in conjunction with any one of the first to sixth aspects, the input unit (20) includes a power supply circuit (8) and a receiver circuit (7). The power supply circuit (8) converts the voltage applied to the input unit (20) into predetermined voltage and delivers the predetermined voltage to the electrical energy storage unit (21). The receiver circuit (7) receives a voltage signal applied to the input unit and outputs, as the communication signal (S1), the voltage signal thus received to the processing unit (5).

This aspect achieves the advantage of not only supplying power to the motor device (1) but also transmitting the communication signal (S1) to the motor device (1) by using voltage as a single physical quantity.

In a controller (10) according to an eighth aspect, which may be implemented in conjunction with any one of the first to seventh aspects, the data for the motor (4) includes at least one of operation data for the motor (4) or data for upgrading a version of a program for use to control the motor (4).

This aspect achieves the advantage of making a single type of motor device (1) compatible with various types of specifications.

A controller (10) according to a ninth aspect is electrically connected to the motor device (1) according to any one of the first to eighth aspects and supplies the power to, and transmits the communication signal (S1) to, the motor device (1).

This aspect achieves the advantage of facilitating reception of the communication signal (S1) transmitted from the controller (10).

A motor system (100) according to a tenth aspect includes the motor device (1) according to any one of the first to eighth aspects and a controller (10). The controller (10) is electrically connected to the motor device (1) and supplies the power to, and transmits the communication signal (S1) to, the motor device (1).

This aspect achieves the advantage of facilitating reception of the communication signal (S1) transmitted from the controller (10).

A fan unit (200) according to an eleventh aspect includes a blade (201) to be attached to the motor (4) of the motor device (1) according to any one of the first to eighth aspects and turns the blade (201) on receiving force produced by the motor (4).

This aspect achieves the advantage of facilitating reception of the communication signal (S1) transmitted from the controller (10).

A communication method according to a twelfth aspect is a method for establishing communication between a controller (10) and a motor device (1) including a motor (4). The communication method includes accepting power supplied from the controller (10) during a first period (T1) and storing, based on the power accepted, electrical energy for driving a processing unit (5) of the motor device (1) in an electrical energy storage unit (21). The communication method further includes receiving at least a communication signal (S1) transmitted from the controller (10) during a second period (T2) after the first period (T1) and updating the processing unit's (5) data for the motor (4) in accordance with the communication signal (S1) received.

This aspect achieves the advantage of facilitating reception of the communication signal (S1) transmitted from the controller (10).

Note that the constituent elements according to the second to eighth aspects are not essential constituent elements for the motor device (1) but may be omitted as appropriate.

REFERENCE SIGNS LIST

1 Motor Device
20 Input Unit
21 Electrical Energy Storage Unit
4 Motor
5 Processing Unit
7 Receiver Circuit
8 Power Supply Circuit
91, 92 Pair of Electric Cables
10 Controller
100 Motor System
200 Fan Unit
201 Blade
S1 Communication Signal
T1 First Period
T2 Second Period
T10 Supply Period
T11 Transmission Period

The invention claimed is:

1. A motor device comprising:
a motor;
an input unit configured to accept power supplied from a controller during a first period and receive at least a communication signal transmitted from the controller during a second period after the first period;
a processing unit configured to update data for the motor in accordance with the communication signal received by the input unit; and
an electrical energy storage unit configured to store, based on the power supplied to the input unit, electrical energy for driving the processing unit.

2. The motor device of claim 1, wherein
the input unit is configured to accept the power via a pair of electric cables to be electrically connected to the controller, and
the input unit is configured to receive the communication signal via the pair of electric cables.

3. The motor device of claim 2, wherein
the processing unit is configured to determine, based on a waveform of voltage applied to the input unit, whether or not the controller is connected to the motor device.

4. The motor device of claim 3, wherein
the controller is configured to alternately go through a supply period in Which the controller supplies the power to the input unit and a transmission period in which the controller transmits the communication signal to the input unit.

5. The motor device of claim 2, wherein
the controller is configured to alternately go through a supply period in which the controller supplies the power to the input unit and a transmission period in which the controller transmits the communication signal to the input unit.

6. The motor device of claim 1, wherein
the processing unit is configured to determine, based on a waveform of voltage applied to the input unit, whether or not the controller is connected to the motor device.

7. The motor device of claim 6, wherein
the controller is configured to alternately go through a supply period in which the controller supplies the power to the input unit and a transmission period in which the controller transmits the communication signal to the input unit.

8. The motor device of claim 1, wherein
the controller is configured to alternately go through a supply period in Which the controller supplies the power to the input unit and a transmission period in which the controller transmits the communication signal to the input unit.

9. The motor device of claim 1, wherein
the transmission period is a period in which output voltage of the electrical energy storage unit does not decrease to less than voltage required to drive the processing unit.

10. The motor device of claim 1, wherein
communication established between the processing unit and the controller is asynchronous serial communication.

11. The motor device of claim 1, wherein
the input unit includes:
a power supply circuit configured to convert the voltage applied to the input unit into predetermined voltage and deliver the predetermined voltage to the electrical energy storage unit; and
a receiver circuit configured to receive a voltage signal as the communication signal applied to the input unit and output the voltage signal to the processing unit.

12. The motor device of claim 1, wherein
the data for the motor includes at least one of operation data for the motor or data for upgrading a version of a program for use to control the motor.

13. A controller electrically connected to the motor device of claim 1 and configured to supply the power to, and transmit the communication signal to, the motor device.

14. A motor system comprising:
the motor device of claim 1; and
a controller electrically connected to the motor device and configured to supply the power to, and transmit the communication signal to, the motor device.

15. A fan unit comprising a blade to be attached to the motor of the motor device of claim 1 and configured to turn the blade on receiving force produced by the motor.

16. A method for establishing communication between a controller and a motor device including a motor,
the method comprising:
accepting power supplied from the controller during a first period and storing, based on the power accepted, electrical energy for driving a processing unit of the motor device in an electrical energy storage unit; and
receiving at least a communication signal transmitted from the controller during a second period after the first period and updating the processing unit's data for the motor in accordance with the communication signal received.

* * * * *